US006305589B1

United States Patent
Chimenti et al.

(10) Patent No.: US 6,305,589 B1
(45) Date of Patent: Oct. 23, 2001

(54) VERTICALLY ENGAGEABLE CARRIER FOOT

(75) Inventors: Thomas A. Chimenti, Fairfield; Jeffrey R. Edgerly, Bristol, both of CT (US)

(73) Assignee: Industri AB Thule, Hillerstorp (SE)

(*) Notice: Subject to any disclaimer, the term of this patent is extended or adjusted under 35 U.S.C. 154(b) by 0 days.

(21) Appl. No.: 09/259,442

(22) Filed: Mar. 1, 1999

(51) Int. Cl.$^7$ ........................................................ B60R 9/00
(52) U.S. Cl. ........................................... 224/321; 224/326
(58) Field of Search .................................. 224/321, 322, 224/325, 326, 329, 330, 331

(56) References Cited

U.S. PATENT DOCUMENTS

| Re. 26,538 | 3/1969 | Bott . |
|---|---|---|
| Re. 26,539 | 3/1969 | Bott . |
| Re. 32,583 | 1/1988 | Bott . |
| D. 264,203 | 5/1982 | Bott . |
| D. 282,155 | 1/1986 | Bott . |
| D. 310,196 | 8/1990 | Bott . |
| 2,415,286 | 2/1947 | Hyde . |
| 2,431,400 | 11/1947 | Iverson . |
| 2,584,283 | 2/1952 | Oliver et al. . |
| 2,613,020 | * 10/1952 | Berry .............................. 224/321 X |
| 3,064,868 | 11/1962 | Treydte . |
| 3,239,115 | 3/1966 | Bott et al. . |
| 3,378,182 | 4/1968 | McMiller . |
| 3,519,180 | 7/1970 | Bott . |
| 3,554,416 | 1/1971 | Bott . |
| 3,615,069 | 10/1971 | Bott . |
| 3,643,973 | 2/1972 | Bott . |
| 3,848,785 | 11/1974 | Bott . |
| 3,951,320 | 4/1976 | Bott . |
| 4,015,760 | 4/1977 | Bott . |
| 4,050,616 | 9/1977 | Mosow . |
| 4,055,284 | 10/1977 | Bott . |

(List continued on next page.)

FOREIGN PATENT DOCUMENTS

| 971140 | 7/1975 | (CA) . |
|---|---|---|
| 2950449 | 6/1981 | (DE) . |
| 3034226 | 4/1982 | (DE) . |
| 3201409 | 9/1983 | (DE) . |
| 3614740 A1 | 11/1987 | (DE) . |
| 3626479 | 2/1988 | (DE) . |
| 193501 | 9/1986 | (EP) . |
| 433495 | 6/1991 | (EP) . |
| 63-53143 | 8/1986 | (JP) . |
| WO 92/02385 | 2/1992 | (WO) . |
| WO 94/10007 | 5/1994 | (WO) . |

*Primary Examiner*—Stephen K. Cronin
(74) *Attorney, Agent, or Firm*—Kilpatrick Stockton LLP

(57) ABSTRACT

An arrangement for securing a load carrier to a transporting vehicle that includes an anchor mechanism adapted for securement to a transporting vehicle and for releasable engagement with a carrier foot. The carrier foot has a latching mechanism for releasable engagement with the anchor mechanism. The latching mechanism is adapted for latching engagement to, and disengagement from the anchor mechanism by movement of the carrier foot in a direction substantially perpendicular to a longitudinal axis of the carrier foot. An example of such movement is vertical movement substantially of an up and down nature. The latching mechanism has a latching and an unlatching configuration and the latching mechanism is urged toward the latching configuration by a resilient biasing mechanism. The latching mechanism is adapted to move from the latching configuration to the unlatching configuration and back to the latching configuration under the influence of the resilient biasing mechanism and responsive to the carrier foot being positioned into latching engagement upon the anchor mechanism. An example of the resilient biasing mechanism is a spring that yields from a latching configuration to an unlatching configuration of that spring as the latching mechanism moves from its latching configuration to its unlatching configuration.

20 Claims, 4 Drawing Sheets

U.S. PATENT DOCUMENTS

| | | |
|---|---|---|
| 4,089,448 | 5/1978 | Traeger . |
| 4,099,658 | 7/1978 | Bott . |
| 4,106,680 | 8/1978 | Bott . |
| 4,126,228 | 11/1978 | Bala et al. . |
| 4,156,497 | 5/1979 | Bott . |
| 4,162,755 | 7/1979 | Bott . |
| 4,165,827 | 8/1979 | Bott . |
| 4,170,322 | 10/1979 | Bott . |
| 4,174,794 | 11/1979 | Bott . |
| 4,175,682 | 11/1979 | Bott . |
| 4,182,471 | 1/1980 | Bott . |
| 4,222,508 | 9/1980 | Bott . |
| 4,239,139 | 12/1980 | Bott . |
| 4,269,339 | 5/1981 | Bott . |
| 4,274,568 | 6/1981 | Bott . |
| 4,274,569 | 6/1981 | Winter et al. . |
| 4,274,570 | 6/1981 | Bott . |
| 4,277,009 | 7/1981 | Bott . |
| 4,295,587 | 10/1981 | Bott . |
| 4,323,182 | 4/1982 | Bott . |
| 4,342,411 | 8/1982 | Bott . |
| 4,364,500 | 12/1982 | Bott . |
| 4,372,469 | 2/1983 | Kowalski et al. . |
| 4,427,141 | 1/1984 | Bott . |
| 4,428,517 | 1/1984 | Bott . |
| 4,431,123 | 2/1984 | Bott . |
| 4,432,478 | 2/1984 | Bott . |
| 4,433,804 | 2/1984 | Bott . |
| 4,440,333 | 4/1984 | Bott . |
| 4,442,961 | 4/1984 | Bott . |
| 4,448,336 | 5/1984 | Bott . |
| 4,448,337 | 5/1984 | Cronce . |
| 4,460,116 | 7/1984 | Bott . |
| 4,469,261 | 9/1984 | Stapleton et al. . |
| 4,473,178 | 9/1984 | Bott . |
| 4,501,385 | 2/1985 | Bott . |
| 4,516,709 | 5/1985 | Bott . |
| 4,586,638 * | 5/1986 | Prescott et al. ............... 224/329 |
| 4,588,117 | 5/1986 | Bott . |
| 4,640,450 | 2/1987 | Gallion et al. . |
| 4,673,119 | 6/1987 | Bott . |
| 4,684,048 | 8/1987 | Bott . |
| 4,702,401 | 10/1987 | Graber et al. . |
| 4,721,239 | 1/1988 | Gibbs, III et al. . |
| 4,754,905 | 7/1988 | Bott . |
| 4,757,929 | 7/1988 | Nelson . |
| 4,770,329 | 9/1988 | Kamaya . |
| 4,838,467 | 6/1989 | Bott et al. . |
| 4,848,112 | 7/1989 | Graber et al. . |
| 4,877,168 | 10/1989 | Bott . |
| 4,877,169 | 10/1989 | Grim . |
| 4,887,754 | 12/1989 | Boyer et al. . |
| 4,890,777 | 1/1990 | Bott . |
| 4,899,917 | 2/1990 | Bott . |
| 4,944,439 | 7/1990 | Bott . |
| 4,967,945 | 11/1990 | Bott . |
| 4,972,983 | 11/1990 | Bott . |
| 5,038,988 | 8/1991 | Thulin . |
| 5,052,605 | 10/1991 | Johansson . |
| 5,143,267 | 9/1992 | Cucheran et al. . |
| 5,158,425 | 10/1992 | Bott . |
| 5,190,198 * | 3/1993 | Cucheran ............... 224/321 |
| 5,201,911 | 4/1993 | Lee . |
| 5,205,453 | 4/1993 | Pudney et al. . |
| 5,232,138 | 8/1993 | Cucheran . |
| 5,275,320 | 1/1994 | Duemmler . |
| 5,282,562 | 2/1994 | Legault . |
| 5,320,264 | 6/1994 | Weir . |
| 5,326,007 | 7/1994 | Pudney et al. . |
| 5,375,750 | 12/1994 | Mandarino et al. . |
| 5,419,479 | 5/1995 | Evels et al. . |
| 5,476,201 | 12/1995 | Hall et al. . |
| 5,715,980 * | 2/1998 | Blankenburg et al. ............... 224/321 |
| 5,839,615 * | 11/1998 | Ray et al. ............... 224/321 |
| 5,931,359 * | 8/1999 | Zona ............... 224/321 |
| 5,988,471 * | 11/1999 | Lundgren ............... 224/329 |
| 6,010,048 * | 1/2000 | Settelmayer ............... 224/321 |

\* cited by examiner

VERTICALLY ENGAGEABLE CARRIER FOOT

TECHNICAL FIELD

The present invention relates generally to vehicular load carriers, and more specifically to load carrier feet used in the attachment and support of load carriers upon a transporting vehicle.

BACKGROUND ART

It is appreciated that a considerable amount of the time that is required to install a load carrier upon a vehicle is that time which is spent on the assembly of the carrier itself prior to its being attached to the transporting vehicle. As a result, it has been found to be an advantageous feature of carrier designs to enable installation and removal of a partially or fully assembled load carrier on to and off of a transporting vehicle.

Known designs for carrier feet that can be installed upon and disconnected from the transporting vehicle while the carrier remains assembled are typically engaged upon a base fixed to the vehicle using a sliding motion parallel to the longitudinal axis of both the carrier foot and the transporting vehicle. This becomes problematic when the entire carrier is to remain assembled during removal because each foot must be simultaneously removed by being slid it off of or out of its respective base together with the other feet. Similar difficulty is encountered when trying to install an assembled carrier onto a transporting vehicle's rooftop or other receiving surface. Each foot must be slidingly engaged upon its respective base, and because that base may not be a perfect fit with the foot, or the base may have become fouled while the foot was disengaged, sliding of the foot onto the base may be resisted. This experience has been likened to trying to slide a sticky drawer into a bureau. Previously, when the feet would each be individually installed upon the respective bases before the load carrier was assembled thereto, an operator could move about the transporting vehicle and manipulate each foot individually. Normally this includes wiggling the carrier foot onto the base in order to progressively slide the carrier foot into a properly seated position upon the base. Having configured each foot, the carrier could then be assembled thereupon. A compounding problem of such a process, however, is that the carrier feet are usually upon the roof of a transporting vehicle at this stage in the process and resultantly assemblage of the load carrier must be awkwardly carried out atop the vehicle. Necessarily, the operator will be reaching atop the transporting vehicle to complete the installation of the load carrier and be required to frequently move about the vehicle be cause that person's reach will be limited by the roof-top location.

Similar problems can be encountered when only a cross bar or strut is connected between two opposite feet and which must be installed to extend from one side to the other of the transporting vehicle. It will be difficult, if not impossible, for a single person working alone to slide each foot onto its respective base because he or she will not be able to simultaneously align both feet with the two respective bases as is required for proper sliding engagement.

Conventional designs for such support feet have required in the past that an exterior cover be opened in order to expose for manipulation the operating device that affects the fastening of the carrier foot to its base. Therefore, when installing the foot upon the base, the exterior cover would normally be open so that the operating device can be manipulated into an open configuration for engagement upon a base or directly to a vehicle. Once engaged, however, the operating device must then again be manipulated to a closed or clamping configuration for fixing the foot to the base or vehicle. The exterior cover of the carrier foot is then closed and locked to prevent unauthorized tampering with the operating device. From the experience of working with these conventionally designed carrier feet, it has been recognized as desirable to minimize not only the exposure of the internal working parts of the foot, but to also minimize required operator interaction during the installation process when both hands can be better used for properly positioning at least the several feet, and possibly an entirely assembled carrier with respect to the various connection points for attachment thereto.

Another drawback of conventionally designed carrier feet are that they do not typically include an accommodation for adapting to differently configured vehicle mounting surfaces. This is particularly true in cases where the feet are attached to the vehicle's roof at edge regions where contoured slopes are generally incorporated into the vehicle's design. Normally, the base for the foot is rigidly attached to the vehicle's roof in this sloped region and it is the carrier foot that is specially designed to be fixedly attached to that particular type of vehicle and to compensate for the roof's configuration. As a result, the manufacturer of the feet must essentially provide custom designs for differently configured roof tops. It has been recognized as highly desirable by such manufacturers to enable a generic carrier foot design to be utilized on a wide range of differently configured transporting vehicle's. Because the primary characteristic affecting this aspect of the design is the degree of slope at the roof region where the base is attached, it has been recognized for the present invention that facilitating pivotation of the carrier foot with respect to the base in the direction substantially parallel to the cross bar with which attachment must be made permits utilization of a uniformly designed carrier foot on multiple and differently configured transporting vehicles.

In view of the above described deficiencies associated with known designs for load carrier feet, the present invention has been developed to alleviate these drawbacks and provide benefits to the user which have been appreciated as desirable at least partially through historical use of these known designs. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed load carrier feet and incorporates several additionally beneficial features.

A primary benefit of the carrier foot design of the present invention is that it permits a carrier foot to be engaged upon a supporting base in a substantially vertical direction and without operator manipulation of latching mechanisms in the carrier foot. Installation is accomplished merely by positioning the carrier foot properly upon the base. This eliminates the sliding engagement described above which has been appreciated as a detrimental characteristic of conventionally designed carrier feet. Also, because the latching member of the present invention's operating mechanism is yieldably biased toward a latching and also locked configuration, the foot can be arranged into the latching and locked configuration before being positioned upon the base and then merely pressed into engagement with the base without further manipulation being required prior to utilization of the carrier foot. A side benefit of this configuration is that it provides a fail-safe design because of the bias toward the locked configuration. That is, the carrier foot is urged away from an unlatching or releasable configuration unless specifically reconfigured thereto by the operator. Still further, an advantageous characteristic of this design is that the carrier foot is made installable and disengageable without the use of tools.

An additional benefit of the present invention is that the operative members of the carrier foot are protectively and permanently housed within the shielding cover of the foot during normal utilization. There is no need to open the foot's housing since the only part of the operating mechanism requiring user manipulation is a push-button release mechanism. But even when the push button release mechanism is depressed for disengaging the foot from the base, the inner working mechanisms of the foot remain protected within the housing for the device.

A locking mechanism is provided that is capable of preventing depression of the push button release mechanism and in turn unauthorized disengagement of the rack from the base. As in traditional designs, the lock is manipulated between locked and unlocked configurations using a conventionally cut key.

As discussed, in order to adapt a universally designed foot to different roof configurations and therefore different transporting vehicles without varying the carrier foot's construction, the latching mechanism in the foot includes a latch body that inserts into a space provided under a cylindrical catch bar thereby fastening the foot to the carrying vehicle. The latch body, however, is not fixed to the catch bar of the base, but instead is permitted to slide therearound. In this manner, pivotation of the foot about a longitudinal axis of the catch bar which is parallel to a longitudinal axis of the foot is facilitated thereby making it possible to adapt the same foot to differently configured vehicle roof designs. That is, the foot can be variably configured with respect to the base depending upon the pitch of the particular vehicle's roof at the point at which the base is connected.

The top or head portion of the carrier foot in which a cross bar or load strut is engageable is manufactured to be exchangeable on the intermediate body portion of the foot. In the illustrated embodiment, the head portion is permanently fastened to the intermediate body portion prior to distribution to an end user. In this manner, the configuration of the foot is easily adapted by the manufacturer depending upon the anticipated shape and design of the cross bar expected to be utilized with the particular foot. In the preferred embodiment, a securing mechanism used for releasably locking the cross bar to the head portion of the carrier foot incorporates members having opposed ramped surfaces that when slid relative to one another cause expansion and/or contraction of the securing mechanism into and/or out of securing engagement with the cross bar. An analogous securing device has been more fully described in commonly owned U.S. Pat. No. 5,038,988, the disclosure of which is expressly incorporated herein by reference.

The separate construction of the base member from the carrier foot body makes it possible for that base member to be custom designed for installation upon a particularly configured vehicle. The connection between the base and the carrier foot, however, is made generic so that the foot body need not be individually adapted for different vehicles. This makes providing an array of product for different vehicles much less expensive than in cases in which each foot must to be customly adapted for a particular vehicle.

As shown, the base can be left on the transporting vehicle with the catch bar exposed when a footed load carrier is not being used. The catch bar can be utilized as a tie-down loop in this configuration for securing other types of loads to the vehicle.

In at least one embodiment, the present invention takes the form of an arrangement for securing a load carrier to a transporting vehicle. The arrangement includes an anchor mechanism that is adapted for securement to a transporting vehicle and for releasable engagement with a carrier foot. The carrier foot of the invention has a latching mechanism for releasable engagement with the anchor mechanism. The latching mechanism is adapted for latching engagement to, and disengagement from the anchor mechanism by movement of the carrier foot in a direction substantially perpendicular to a longitudinal axis of the carrier foot. An example of such movement is vertical movement substantially of an up and down nature.

The latching mechanism has a latching and an unlatching configuration and the latching mechanism is urged toward the latching configuration by a resilient biasing mechanism. Further, the latching mechanism is adapted to move from the latching configuration to the unlatching configuration and back to the latching configuration under the influence of the resilient biasing mechanism and responsive to the carrier foot being positioned into latching engagement upon the anchor mechanism. An example of the resilient biasing mechanism is a spring that yields from a latching configuration to an unlatching configuration of that spring as the latching mechanism moves from its latching configuration to its unlatching configuration.

In the illustrated embodiment, the latching mechanism has an operating mechanism for configuring the latching mechanism between the latching and the unlatching configurations. As shown, the operating mechanism includes a push-button actuator for operating the latching mechanism between the latching and the unlatching configurations. The push-button actuator is operatively associated with and controlled by a lock mechanism which is configured for alternatively allowing and preventing operation of the operating mechanism. Furthermore, the push-button actuator also cooperates with a resilient biasing mechanism for urging the push-button actuator toward a latching configuration.

The arrangement includes a housing configured to encase the operating mechanism and the latching mechanism thereby preventing access to such working mechanisms of the carrier foot. In a preferred embodiment, the push-button actuator is exclusively exposed through the housing for operator manipulation. That is, the only portion of the carrier foot that the operator must engage is the push-button actuator, and that is only when disengagement is required. Installation is accomplished without the operator having to manipulate the carrier foot at all, other than to move it into the latched configuration.

The anchor mechanism has a catch member and the latching mechanism has a latch body. The latch body is configured for latching cooperation with the catch member. In the illustrated embodiment, the catch member is a bar suspended between a pair of supports. It is the bar that defines a catch area underneath itself for accepting at least a portion of the latch body therein.

The anchor mechanism is adapted to be fixed upon a vehicle with the catch member disposed at a distance from the vehicle. Usually, and as illustrated, this location is proximate the roof edges of the vehicle. The latch body has an abutment surface designed for engagement with the catch member in a latched configuration. As shown, the latch body has an inclined surface that is arranged for sliding engagement against the catch member as the carrier foot is installed upon the anchor mechanism. This sliding engagement causes the latching mechanism to move from the latching configuration into the unlatching configuration thereby permitting installation of the carrier foot into latched engagement upon the anchor mechanism.

Still further, the latching mechanism can be adapted to permit pivotation of the carrier foot about an axis that is substantially parallel to the longitudinal axis of the carrier foot while the carrier foot is latched to the anchor mechanism. This makes it possible for the carrier foot to be utilized on variously pitched vehicular support surfaces, usually automobile roofs having different shapes at their edge regions.

The latching mechanism has an operating mechanism for configuring the latching mechanism between the latched and the unlatching configurations. As shown, the operating mechanism has a pushing shoulder adapted to engage a receiving shoulder of the latch body for transferring or conveying movement of the operating mechanism to the latch body.

In at least one embodiment of the present invention, an exchangeable head assembly is provided that is coupleable; that is, designed to be connected to a top portion of the carrier foot. The exchangeable head assembly is adapted for releasable fixation with a load carrier cross bar. When mounted upon a vehicle, a load carrier cross bar is coupled or connected between two such carrier feet that are each positioned near to opposite end portions of the load carrier cross bar for suspending the cross bar atop the transporting vehicle.

As illustrated, the anchor mechanism additionally includes an insert adapted to be securably received in a channel portion of a vehicularly mounted roof-top track. It is in this way that that particular version of the invention is secured upon a vehicle's roof that is adapted with such tracks.

In another embodiment, the present invention takes the form of an arrangement for securing a load carrier to a transporting vehicle that has an anchor mechanism adapted for securement to a transporting vehicle and for releasable engagement with a carrier foot. The anchor mechanism has a catch member that is configured for engagement with a latching mechanism. A carrier foot has a latching mechanism that is adapted to assume a latched configuration responsively to being positioned upon the catch member. The arrangement is further adapted to permit pivotation of the latching mechanism relative to the catch member when in a latched configuration so that the carrier foot is permitted to be variably positioned with respect to the anchor mechanism after assumption of the latched configuration.

Still another embodiment of the invention takes the form of a method for securing a load carrier to a transporting vehicle. The method includes providing an anchor mechanism that is adapted for being secured to a transporting vehicle and for releasable engagement with a carrier foot. The anchor mechanism has a catch member that is configured for engagement with a latching mechanism. A carrier foot is installed that has a latching mechanism upon the catch member. The latching mechanism is adapted to assume a latched configuration under the exclusive actuation of the catch member in response to the carrier foot being installed upon the anchor mechanism.

The method further includes resiliently biasing the latching mechanism toward a latching configuration prior to the carrier foot being installed upon the anchor mechanism. The latching mechanism is then reconfigured from the latching configuration to an unlatched configuration and then to the latched configuration based solely on its cooperation with the catch member as the carrier foot is being installed upon the anchor mechanism. After such installation, the carrier foot may be pivoted relative to the anchor mechanism about an axis substantially parallel to a longitudinal axis of the carrier foot after being installed upon the anchor mechanism and while the latching mechanism is in the latched configuration.

The beneficial effects described above apply generally to the exemplary devices and mechanisms disclosed herein of a load carrier foot arrangement. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
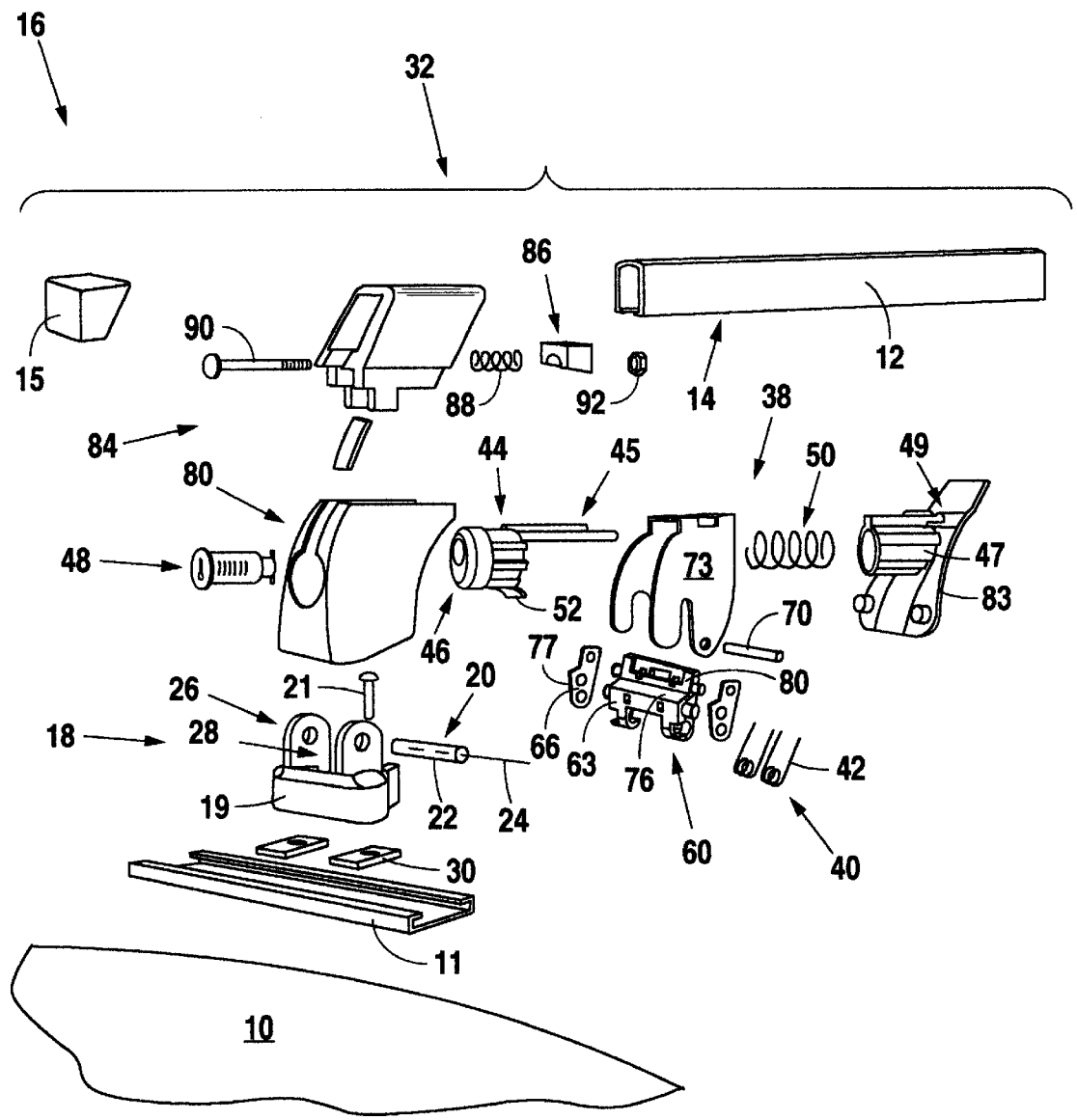
FIG. 1 is an exploded perspective view of a carrier foot arrangement constructed according to the present invention.

Referring to the figures, and particularly to FIG. 1 at this time, a partial section of the roof region of a transporting vehicle 10 is shown with a track channel 11 installed thereupon. The channel 11 typically has a C-shaped transversely viewed cross-section and may be mounted upon the upper exterior surface of an edge region of a vehicular roof or recessed thereinto. In either case, the track channel 11 is provided to accept insert portions 30 of an anchor mechanism 18 that is designed as a component of an arrangement 16 for securing a load carrier to transporting vehicle 10. The anchor mechanism 18 serves as a support platform for a load carrier foot 32. In the illustrated embodiment, the anchor mechanism 18 includes the square metal inserts 30 that are connected to a base portion 19, one each by a threaded screw 21. In use, the metal inserts 30 are positioned within the C-shaped channel 11 with the threaded screw 21 inserted through a lengthwise top opening into the channel 11. The headed portion of the screw 21 is located above the base portion 19 and the threaded portion of the screw 21 extends through the base portion 19 and into a receiving threaded aperture of the insert 30. The base portion 19 is fixed with respect to the channel 11, and in turn the transporting vehicle 10 by sufficiently tightening the screws 21 so that the insert 30 is drawn up against the underside of the inwardly extending flanges of the channel 11 and so that a lower surface of the base portion 19 is pressed firmly against the vehicle's 10 supporting surface.

The arrangement 16 for securing a load carrier to a transporting vehicle 10 places the carrier foot 32 above the anchor mechanism 18. A top portion 36 of the carrier foot 32 is adapted to accept an exchangeable head assembly 84. The exchangeable head assembly 84 is provided for releasable engagement with a load carrier cross bar 12, typically at an end portion 14 thereof. Each head assembly 84 is adapted to be exchangeable with differently configured head assemblies 84. An array of head assemblies 84 may be differently configured because each is designed for releasably capturing a load carrier cross bar 12 having a different shape and design. Typically, the head assembly 84 will only be exchangeable for the manufacturer of the arrangement 16 and not the purchaser. That is, as far as the end-user or consumer is concerned, the head assembly 84 is a permanent part of the carrier foot 32. One example of how this can be accomplished is by using threaded screws to couple the head assembly 84 to the top 36 of the carrier foot 32 from within the protected space of the interior region of the carrier foot 32. In this manner the operational or headed end of the screw will not be easily accessed by the consumer. The exchangeable nature of the head assembly 84 is provided so that a manufacturer can easily vary the configurations of the carrier foot 32 to accommodate a wide array of variously styled cross bars 12 that the consuming public may desire to use in combination with the carrier foot 32 of the present invention.

As shown, the head assembly 84 includes a sliding wedge 86 that cooperates with an oppositely configured inclined plane within the head assembly 84. By drawing the sliding wedge 86 up the inclined plane, a tightening engagement between the wedge 86 and a corresponding surface of the load carrier cross bar 12 is affected. In the illustrated embodiment, a threaded bolt's 90 incorporation with a nut 92 is utilized for moving the wedge 86. A spring 88 is shown that acts to bias the wedge 86 down the inclined plane and toward a released configuration in which the cross bar 12 is permitted to slide longitudinally in the head assembly 84. Once the cross bar 12 is properly positioned and fixed to the carrier foot 32, an end cap 15 may be pressingly installed upon the exposed end of the cross bar 12 for closing and providing a finished appearance for the cross bar 12 outside the carrier foot 32.

Referring to FIG. 1, the configuration of the anchor mechanism 18 may be best appreciated. Extending upwardly from the base portion 19 are a pair of supports 26 that form flanges to which a catch member 20 is installable and fixable. In the illustrated embodiment, the catch member 20 takes the form of a cylindrical bar 22 having end portions retained within apertures that extend through each of the pair of supports 26. As will be described in greater detail hereinbelow, a central axis of the bar 22 serves as a pivotation axis 24 about which the carrier foot 32 is pivotable in an installed configuration. In this manner, the bar 22 is suspended above an open space that defines a catch area 28.

The carrier foot 32 includes an intermediate body portion 37 having a housing encasement 82 that covers and protects the internal working mechanisms of the foot 32. One of those working mechanisms is a latching mechanism 38 utilized for releasably securing the carrier foot 32 to the anchor mechanism 18.

Serving as a support for the latching mechanism 38 are two side flanges 73, each having an aperture therethrough for receiving a pivot axle 70 upon which a latch body 60 is journal for pivotation between a latching configuration and an unlatching configuration. The latch body 60 is designed so that at least a portion thereof is insertible into the catch area 28 underneath the catch member 20.

Figure 2:
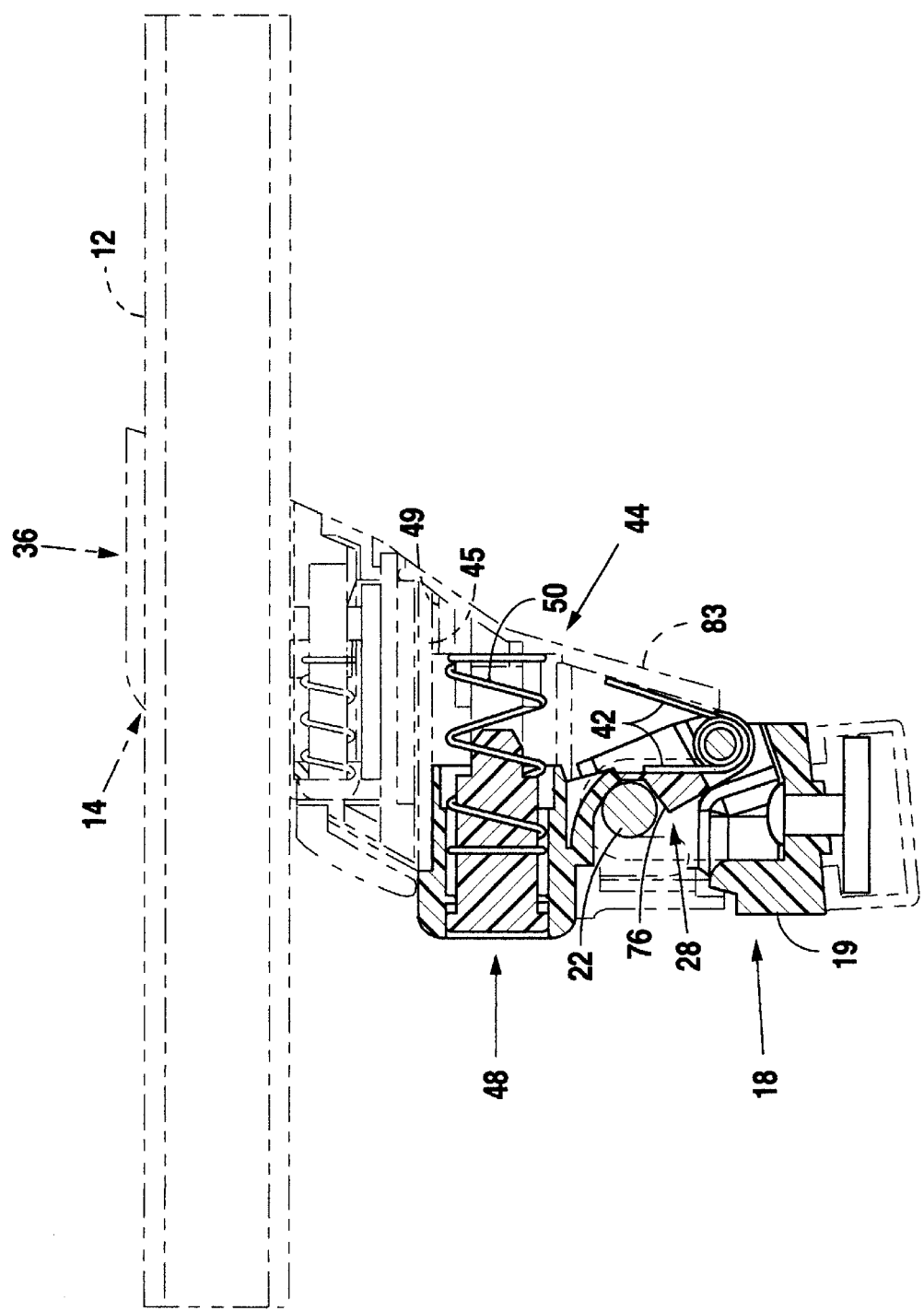
FIG. 2 is a partial cut-away and partial cross-sectional view taken substantially along a bisecting centerline of the carrier foot arrangement of FIG. 1 in a latching configuration.

Referring to FIG. 1, an exploded configuration of the latch body 60 is shown depicting and interior body portion 63 sandwiched between two exterior ears 66. In a preferred embodiment, the interior body portion 63 is constructed from light-weight plastic and the exterior ears 66 are constructed from more durable steel. In this manner, most of the forces being conveyed through the latch body 60 are concentrated within the stronger ear portions 66. A resilient biasing mechanism 40 in the form of a spring 42 is utilized to urge the latch body 60 toward the latching configuration. The latching configuration is depicted in FIG. 2 in which an abutment surface 76 of the latch body 60 is under and in abutting engagement with the catch member 20.

The carrier foot 32 and the anchor mechanism 18 are configured so that the foot 32 can be pressed or position into latched engagement with the anchor mechanism 18 without further operator manipulation. To enable this feature, the installation process is initiated with the latch body 60 in the orientation depicted in FIG. 2. In this manner, as the carrier foot 32 is moved into position adjacent to the anchor mechanism 18, an inclined surface 77 of the latch body 60, a surface which is exposed toward the anchor mechanism 18, is generally the first portion of the carrier foot 32 to engage the catch member 20 upon proper approach. After initial engagement and as the carrier foot 32 is moved further down onto the anchor mechanism 18, the bar 22 of the catch member 20 slides up the inclined surface 77 pressing the latch body 60 backward out of the bar's 22 way and in the process compresses the resilient biasing mechanism 40.

As illustrated, the resilient biasing mechanism 40 takes the form of the spring 42. Once the carrier foot 32 is moved sufficiently far down upon the anchor mechanism 18 to be properly seated thereupon, the catch member 20 has slid beyond a top edge of the inclined surface 77 so that the latch body 60 springs outwardly into the catch area 28 under the influence of the spring 42. In this position, the abutment surface 76 is properly positioned to catch under the catch member 20. Under the bias of the spring 42, the latch body 60 will remain in the latching configuration under the catch bar 22 until purposely moved to an unlatching configuration by the operator.

Figure 3:
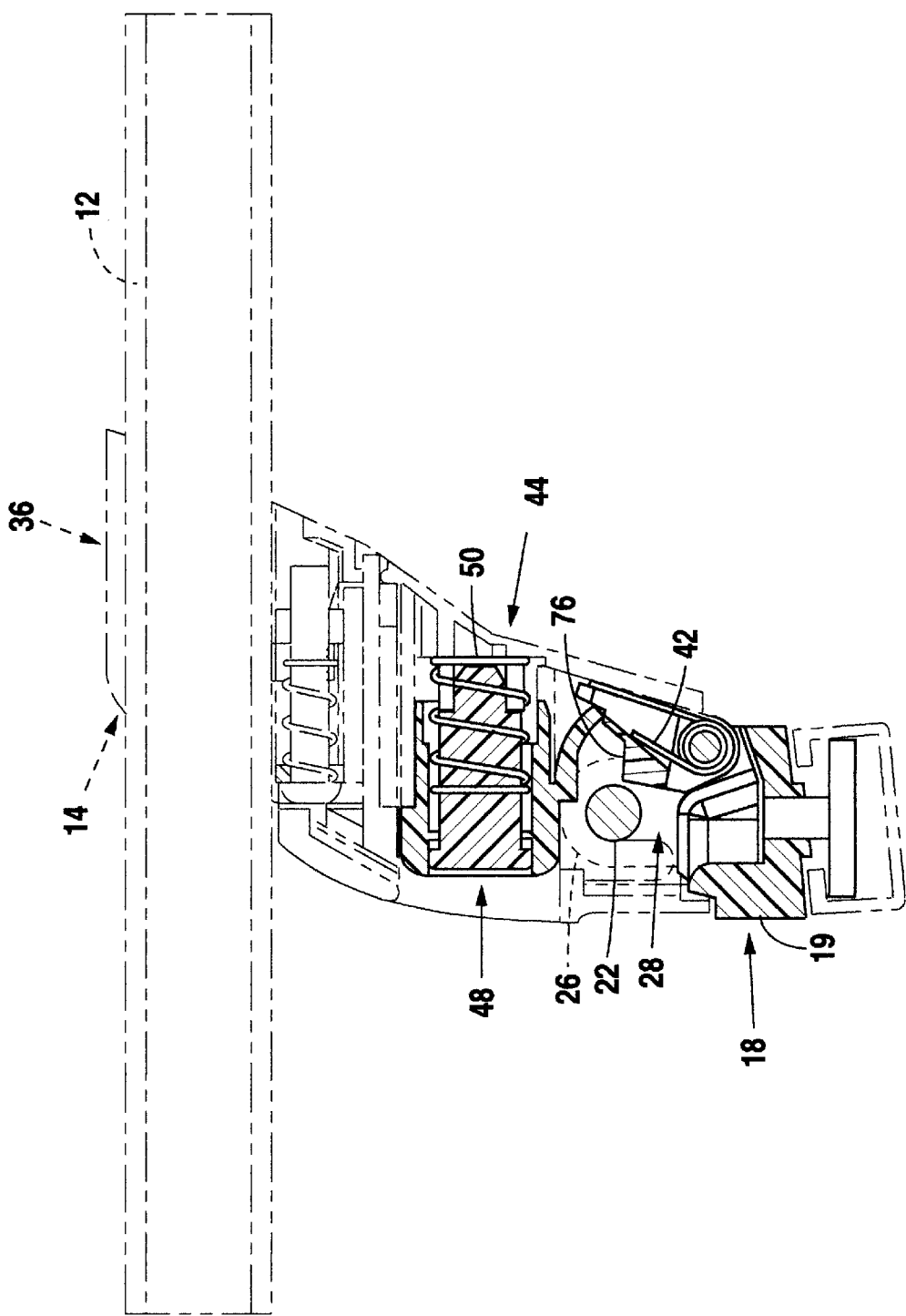
FIG. 3 is a partial cut-away and partial cross-sectional view taken substantially along a bisecting centerline of the carrier foot arrangement of FIG. 1 in an unlatched configuration.
Figure 4:
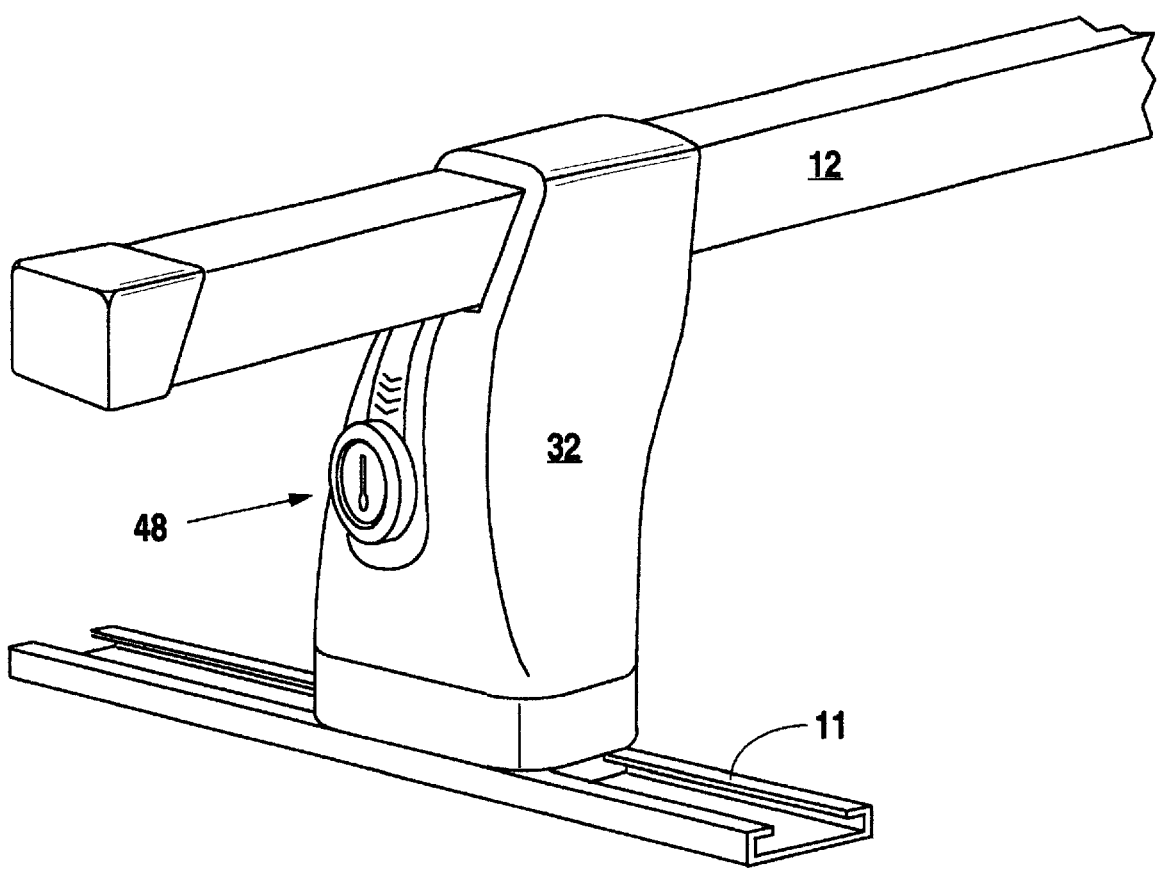
FIG. 4 is an assembled perspective view of the carrier foot arrangement of FIG. 1.

The unlatching configuration of the arrangement 16 is illustrated in FIG. 3. Therein, an operating mechanism 44 is shown depressed into the carrier foot 32. The purpose of the operator depressing the operating mechanism 44 is to cause the pushing shoulder 52 of the operating mechanism 44 to also travel inwardly and engage the receiving shoulder 80 of the latch body 60. Continued inward travel of the pushing shoulder 52 causes the latch body 60 to be pivoted back out of the catch area 28 so that the abutment surface 76 is no longer trapped under the catch member 20. This effectively disengages the carrier foot 32 from the anchor mechanism 18. The carrier foot 32, and any load carrier or load carrier cross bar 12 connected to the foot 32 can now be lifted away from the transporting vehicle 10.

The operating mechanism 44 is manipulated by an operator through the use of the push-button actuator 46 which is at least partially exposed through the housing encasement 82. The actuator 46 includes guide prongs 45 as illustrated. An interior travel guide 47 is provided that is fixed upon a housing closure member 83 that matingly engages with the housing encasement 82 to form a substantially complete enclosure for the intermediate body portion 37 of the carrier foot 32. The interior travel guide 47 has an exterior surface complimentarily configured to facilitate gliding operation of the push button actuator 46 thereupon. Still further, the interior travel guide 47 has receivers specifically arranged to form prong tracks 49 within which the guide prongs 45 slide and which also assist in guiding travel of the push button actuator 46 and its associated components, including the pushing shoulder 52.

A resilient biasing mechanism 50 in the form of a coil spring is provided to urge the push button actuator 46 toward an unactuated configuration as is shown in FIG. 2. In this manner, the pushing shoulder 52 will normally be moved away from the latch body 60 unless purposefully depressed by and operator to cause the assumption of the unlatching configuration of the carrier foot 32.

A lock mechanism 48 is provided for cooperation with the push button actuator 46 of the operating mechanism 44. In the illustrated embodiment, the lock mechanism 48 is of a conventional design having a head portion with a protrusion that can be rotated into and out of locking engagement with a receiving recess using a conventional key. When in the locked configuration, the protrusion of the lock mechanism 48 prevents sliding operation of the push button actuator 46 upon the travel guide 47 because the protrusion is caught within the recess in the body 37 of the carrier foot 32. In this manner, unauthorized disengagement of the carrier foot 32 from the anchor mechanism 18 is prevented. Because the latch body 60 is spring biased toward the latching configuration, the operating mechanism 44 can be locked prior to the foot 32 being positioned upon the anchor mechanism 18 and further manipulation by the operator is not required for affecting locked and latched connection of the foot 32 thereupon.

An arrangement 16 for securing a load carrier to a transporting vehicle 10 has been described herein. These and other variations which will be appreciated by those skilled in the art are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the vehicular load carrier industries.

What is claimed and desired to be secured by Letters Patent is as follows:

1. An arrangement for securing a load carrier to a transporting vehicle, said arrangement comprising:

an anchor mechanism adapted for securement to a transporting vehicle and for releasable engagement with a carrier foot;

said carrier foot comprising a latching mechanism, said latching mechanism engages said anchor mechanism in an engagement position by moving said carrier foot in a direction substantially perpendicular to a longitudinal axis of said carrier foot such that said carrier foot is secured to said anchor mechanism and said latching mechanism disengages said carrier foot from said anchor mechanism in a disengagement position such that said carrier foot freely moves from said anchor mechanism by moving said carrier foot in a direction substantially perpendicular to a longitudinal axis of said carrier foot; and said latching mechanism establishing a pivoting connection between said carrier foot and said anchor mechanism thereby permitting pivotation of said carrier foot about an axis substantially parallel to said longitudinal axis of said carrier foot while said carrier foot is latched to said anchor mechanism thereby accommodating utilization of said carrier foot on variously pitched vehicular support surfaces.

2. The arrangement as recited in claim 1, further comprising:

an exchangeable head assembly coupleable to a top portion of said carrier foot, said exchangeable head assembly being adapted for releasable fixation with a load carrier cross bar.

3. The arrangement as recited in claim 1, wherein said anchor mechanism further comprises:

an insert adapted to be securably received in a channel portion of a vehicularly mounted roof-top track.

4. The arrangement as recited in claim 1, wherein said direction of movement for engaging and disengaging said latching mechanism to and from said anchor mechanism is substantially vertical.

5. The arrangement as recited in claim 1, further comprising:

a load carrier cross bar coupled between two of said carrier feet, one each of said two carrier feet positioned proximate to an end portion of said load carrier cross bar for suspending said cross bar atop a transporting vehicle.

6. The arrangement as recited in claim 1, further comprising:

said anchor mechanism having a catch member and said latching mechanism having a latch body, said latch body being configured for latching cooperation with said catch member.

7. The arrangement as recited in claim 6, wherein said catch member is a bar suspended between a pair of supports, said bar defining a catch area thereunder for accepting at least a portion of said latch body therein.

8. The arrangement as recited in claim 6, further comprising:

said anchor mechanism being adapted for fixable relative engagement upon a vehicle with said catch member disposed at a distance from the vehicle; and said latch body having an abutment surface for engagement with said catch member in a latching configuration.

9. The arrangement as recited in claim 6, further comprising:

said latch body having an inclined surface arranged for sliding engagement against said catch member as said carrier foot is installed upon said anchor mechanism wherein said sliding engagement causes said latching mechanism to move from said latching configuration into said unlatching configuration thereby permitting installation of said carrier foot into latched engagement upon said anchor mechanism.

10. The arrangement as recited in claim 6, wherein said latching mechanism further comprises:

an operating mechanism for configuring said latching mechanism between said latching and said unlatching configurations, said operating mechanism having a pushing shoulder adapted to engage a receiving shoulder of said latch body for transferring movement of said operating mechanism to said latch body.

11. The arrangement as recited in claim 1, further comprising:

said latching mechanism having a latching and an unlatching configuration, said latching mechanism being urged toward said latching configuration by a resilient biasing mechanism.

12. The arrangement as recited in claim 11, wherein said latching mechanism is adapted to move from said latching configuration to said unlatching configuration and back to said latching configuration under the influence of said resilient biasing mechanism and responsive to said carrier foot being positioned into latching engagement upon said anchor mechanism.

13. The arrangement as recited in claim 12, wherein said resilient biasing mechanism is a spring that yields from a latching configuration to an unlatching configuration as said latching mechanism moves from its latching configuration to its unlatching configuration.

14. The arrangement as recited in claim 11, said latching mechanism further comprising an operating mechanism for configuring said latching mechanism between said latching and said unlatching configurations.

15. The arrangement as recited in claim 14, said operating mechanism further comprising a push-button actuator for operating said latching mechanism between said latching and said unlatching configurations.

16. The arrangement as recited in claim 15, wherein said push-button actuator is operatively associated with and controlled by a lock mechanism, said lock mechanism configured for alternatively allowing and preventing operation of said operating mechanism.

17. The arrangement as recited in claim 15, said push-button actuator further comprising a resilient biasing mechanism for urging said push-button actuator toward a latching configuration.

18. The arrangement as recited in claim 15, further comprising:

a housing configured to encase said operating mechanism and said latching mechanism thereby preventing access to such working mechanisms of said carrier foot.

19. The arrangement as recited in claim 18, wherein said push-button actuator is exclusively exposed through said housing for operator manipulation.

20. An arrangement for securing a load carrier to a transporting vehicle, said arrangement comprising:

an anchor mechanism for securing a carrier foot to a vehicle, said anchor mechanism comprising a catch member; and said carrier foot comprising a latching mechanism having a latch body for engaging said catch member in an engaged position by moving said carrier foot in a direction substantially perpendicular to a longitudinal axis of said carrier foot such that said carrier foot is secured to said anchor mechanism thereby permitting pivotation of said carrier foot about an axis substantially parallel to said longitudinal axis of said carrier foot while in said engaged position thereby accommodating utilization of said carrier foot on variously pitched vehicular support surfaces and said latch body disengages from said catch member in a disengaged position such that said carrier foot is separated from said anchor mechanism by moving said carrier foot in a direction substantially perpendicular to a longitudinal axis of said carrier foot.

* * * * *